(12) United States Patent
LeMay et al.

(10) Patent No.: US 7,201,662 B2
(45) Date of Patent: Apr. 10, 2007

(54) METHOD AND APPARATUS FOR SOFTWARE AUTHENTICATION

(75) Inventors: Steven G. LeMay, Reno, NV (US); Jamal Benbrahim, Reno, NV (US); Xuedong Chen, Lidcombe (AU)

(73) Assignee: IGT, Reno, NV (US)

( * ) Notice: Subject to any disclaimer, the term of this patent is extended or adjusted under 35 U.S.C. 154(b) by 340 days.

(21) Appl. No.: 10/458,846

(22) Filed: Jun. 10, 2003

(65) Prior Publication Data

US 2003/0216172 A1 Nov. 20, 2003

Related U.S. Application Data

(63) Continuation of application No. 09/643,388, filed on Aug. 21, 2000, now abandoned.

(51) Int. Cl.
*A63F 13/00* (2006.01)
(52) U.S. Cl. .................... 463/43; 463/25; 463/20; 463/29
(58) Field of Classification Search .............. 463/25, 463/29, 42, 20, 43
See application file for complete search history.

(56) References Cited

U.S. PATENT DOCUMENTS

| | | | | |
|---|---|---|---|---|
| 4,727,544 A | * | 2/1988 | Brunner et al. | 463/29 |
| 5,155,768 A | * | 10/1992 | Matsuhara | 463/29 |
| 5,599,231 A | * | 2/1997 | Hibino et al. | 463/29 |
| 5,643,086 A | * | 7/1997 | Alcorn et al. | 463/29 |
| 6,006,328 A | * | 12/1999 | Drake | 713/200 |
| 6,104,815 A | * | 8/2000 | Alcorn et al. | 380/251 |
| 6,106,396 A | * | 8/2000 | Alcorn et al. | 463/29 |
| 6,108,420 A | * | 8/2000 | Larose et al. | 705/59 |
| 6,138,236 A | * | 10/2000 | Mirov et al. | 713/200 |
| 6,149,522 A | * | 11/2000 | Alcorn et al. | 463/29 |
| 6,178,510 B1 | | 1/2001 | O'Connor et al. | |
| 6,364,769 B1 | * | 4/2002 | Weiss et al. | 463/29 |
| 6,722,986 B1 | * | 4/2004 | Lyons et al. | 463/29 |

FOREIGN PATENT DOCUMENTS

| GB | 2121569 | * 12/1983 |
|---|---|---|
| JP | 09-262359 | * 10/1997 |
| WO | WO-01/67218 | 9/2001 |

* cited by examiner

*Primary Examiner*—John M. Hotaling, II
*Assistant Examiner*—Tramar Harper
(74) *Attorney, Agent, or Firm*—Marshall, Gerstein & Borun LLP

(57) ABSTRACT

A method and apparatus for authenticating gaming machine software is disclosed. In one embodiment the method and apparatus is used to authenticate the contents of a removable media. Use of a removable media provides means to store large amounts of software on a single media to install software, perform software updates, diagnose gaming machines, authenticate software, or configure gaming machines. An authentication file may contain a listing of each file on the removable media and an associated hash value calculated with a hash function. The hash values are calculated and stored in an authentication file and encryption of the one or more hash values may occur. A hash value re-calculation is performed on each file at a later time to determine the hash value at the time of use. The re-calculated hash values are compared to the decrypted hash values stored in the authentication file.

18 Claims, 11 Drawing Sheets

METHOD AND APPARATUS FOR SOFTWARE AUTHENTICATION

RELATED APPLICATION DATA

This application is a continuation of U.S. patent application Ser. No. 09/643,388, filed Aug. 21, 2000 now abandoned.

FIELD OF THE INVENTION

The present invention relates to processor based gaming systems and in particular to an improved method and apparatus for authenticating software or data.

BACKGROUND OF THE INVENTION

Electronic gaming devices utilizing electronics and software to control game operation are a popular alternative to traditional table based gaming. As is known in the art, electronic gaming devices generally include a processor, a software storage device, a video display and software configured to interact with the processor, software storage device and display to present a game for play by a player. Traditionally, the software storage device comprised a read only memory (ROM) device, such as an EPROM, to satisfy strict gaming regulations promulgated by gaming control authorities to insure fraud free game play and prevent unwanted alteration of the gaming software. Such alteration could affect gaming odds and provide either the electronic gaming device owner or the player with an unfair advantage.

To insure that the game play is fair, the software that controls game play is inspected and authorized by the gaming control authorities prior to installation of the software on the machine. At any time thereafter, the gaming software can be analyzed by the casino or the gaming control authorities to verify that the gaming software has not been altered. Thus, the gaming regulations require that means exist to verify that the software controlling the gaming device is the same software approved by the regulatory body.

In the past, the traditional method to configure gaming machines to comply with gaming regulations was to submit the software to gaming regulators for approval. After the software was approved, a mathematical operation was conducted on the software code. This mathematical operation generates a value that is generally unique to the particular software code. This value was recorded by the manufacture or the gaming regulators for later use. In one embodiment this value is generated by a hash operation and is referred to as a hash value.

After the software is approved the hash value is stored for future reference. The approved software may be stored by a regulator entity and also stored on a ROM. A copy of the approved ROM is eventually installed in a gaming machine. The ROM is a desirable apparatus for storage due to its general read only operation.

Thereafter, if it is required to determine if the software had been altered, the ROM was removed from gaming machine for analysis by an authentication device operated under the control of the appropriate authority. This authentication device subjects the code on the ROM to the same mathematical operation as performed by the gaming regulators to generate the hash or other identifying value. This new hash value is manually compared (visually) to the previously recorded hash value. If the values match, the software code has not been altered and hence can be trusted. This operation is commonly referred to as "authentication."

While the ROM authentication process satisfied gaming regulators, it hampered advancement of game development and subjected regulators, casino operators, and gaming machine manufactures to increased costs and limitations.

For example, one drawback is the limited storage capabilities of a traditional ROM, i.e. EPROMs. This prevents the game developers from integrating more features into the game and gaming device due to limitations in software storage space.

Another drawback arose as a result of the use of a specialized devices for authentication. Commonly EPROMs are authenticated with an EPROM reader, such as one available from Kobetron. This authentication method required a skilled technician to remove the ROM from the socket on the electronics board and place it in a specialized reader. Not only are skilled technicians costly to employ, the pins of the ROM were often damaged during the process of removal, testing, and re-insertion. Moreover, this process resulted in the gaming device being out of service for a undesirably long period of time. Hence, casino revenues were lost. In many jurisdictions government representatives must be present when a processor board is accessed.

A similar drawback arose when the game was updated or a new game installed at the machine. To update a game on a gaming machine using the ROM for game storage, the entire ROM would have to be removed and a new ROM inserted or installed. For the above reasons, this is undesirable.

One proposed alternative has been to install a larger storage device than a ROM, such as a hard drive, in the gaming machine to provide additional storage for software or data. This proposed alternative is described in U.S. Pat. No. 5,643,086 entitled, "Electronic Casino Gaming Apparatus with Improved Play Capacity, Authentication and Security" owned by Silicon Gaming. In this arrangement if the game requires updating or replacement, it may even be necessary to replace the entire hard drive. This is an expensive and labor intensive undertaking. Further, with this type of installation, it may not be possible to diagnose the gaming machine, or service the gaming machine.

There exists therefore, a need for an improved method and apparatus for storage, authentication, and modification of gaming software in a manner capable of complying with gaming regulations.

SUMMARY OF THE INVENTION

The various embodiments of the invention provide various methods and apparatus to authenticate the content of a media, such as for example the contents of a hard drive or a removable media. The authentication guarantees the user of the data stored on the media that the data has not been tampered with, altered, or otherwise changed. This guarantee is particularly desirable when the data, such as a software install or software update is to control the operation of the machine or device on which the install or update will occur. Examples of such devices include a gaming machine, an automated teller machine, or a sales kiosk.

One desirable feature of the present invention over the prior art comprises use of a removable media reader in conjunction with the device or system to thereby provide means to upload or interact with the system or device.

One example method and apparatus to achieve authentication comprises creating authentication files on the media.

The authentication file is preferably created based on the contents of the media when the contents of the media are known to be accurate and trusted.

The contents of the authentication file may vary depending on the particular needs of the user or the system. In one embodiment the contents of the authentication file are stored in a file verification table (FVT). The FVT comprises a table containing an entry for each file on the media and an associated entry or hash value. The hash value represents a value that is unique to a particular file's contents at the time the value is generated, i.e. when the contents of the file are known to be trusted. In one embodiment the value is generated from a hash routine, such as MD5, and stored in the FVT. Thus, in one embodiment the contents of the FVT contain a list of each file on the media and a hash value entry generated from each file on the media.

In one variation, an additional hash operation occurs on the FVT to create a data value referred to herein as a file signature. The signature is also stored in the FVT on the media. The FVT may be stored in the authentication file. The authentication file may be stored on the media or at another desired location.

It is further contemplated that at a later time, the software or data stored on the media will be used. One example use of the software or data on the media is to install the software or data on a more permanent or fixed media such as a hard drive or flash media that is fixedly attached to the system or device. To guarantee that software or data on the media has not been tampered with or has not been swapped, an authentication process occurs on the media. The authentication process uses the hash algorithms or a copy thereof that were used to create the initial hash values. It is contemplated that the algorithms or hash function equations are stored on a secure memory in the device from which the software is to be authenticated. In one embodiment one or more encryption/decryption algorithms are stored on the secure memory. Any algorithms on the secure memory is available at a later date or at a remote location and, because they are on a secure memory, they can not be altered without leaving physical evidence of the alteration. It is contemplated that the contents of the secure memory could be encrypted.

In general, the authentication process comprises re-executing the hash function on the files of the media at the time of authentication (usually at a later time) and comparing the originally calculated hash value, that is stored in the FVT, to the re-calculated hash value. It should be understood that the originally calculated hash value need not be stored in the FVT and that functions other than a hash function may be utilized without departing in scope from the invention.

In yet another variation, the signature value is encrypted when the software or data is known to be trusted and then the encrypted signature value is also stored in the FVT.

To achieve the authentication, the authentication process first obtains a signature by hashing the FVT up to the encrypted file signature, and then decrypts the encrypted signature in the FVT. Thereafter, the decrypted signature is compared to the newly obtained signature. If the decrypted signature matches the newly obtained signature then the authentication process continues, since there is not yet an indication of tampering or alteration. If the signatures were not identical, then tampering may have occurred.

Next, in the embodiment described herein, the operation reads the first file from the FVT and its associated hash value, also stored in the FVT. The operation then locates this first file on the media and performs the hash function on this file name to obtain a re-calculated hash value for the first file. The re-calculated hash value is then compared to the same file's hash value as stored in the FVT. If these two values match or are identical, then the authentication process continues since there is not yet an indication of tampering or alteration.

The process continues in this manner until all the files on the media or in the FVT have been compared in the above described process or a similar process. Additional comparisons can be executed in the authentication process such as file structure, file content, directory structure or directory content. One advantage that the invention provides is the use and re-use of an inexpensive removable media for the install and update of software on a device requiring use of only secure or trusted software. This desirably provides for re-use of the fixed media in the device overcoming the need to dispose of the fixed media if an update or re-install was required. Further, removable media are capable of storing large volume of data, software, or code thereby allowing large amounts of software to be installed or updated. Many removable media are also easy to load and remove from the device and hence overcome the disadvantages associated with fixed devices, such as hard disk drives, and ROM devices.

Moreover, removable media may be utilized in a simple cost effective manner without having to disassemble the machine or install or remove the ROM or other secure memory devices. Use of the invention may be achieved by service technicians without assistance of highly skilled technicians.

Further objects, features, and advantages of the present invention over the prior art will become apparent from the detailed description of the drawings which follows, when considered with the attached figures.

DETAILED DESCRIPTION OF THE INVENTION

The invention is a method and apparatus for authentication of software on a system to verify the integrity of the system. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. Moreover, any of the details or features described herein may be utilized alone or in any combination.

Example Environment

Provided now for purposes of understanding and not limitation is a brief discussion of an example environment particularly well suited for use of the invention described herein. One example environment of the invention described herein is in a gaming device at least partially controlled by software as might be found in a casino or other gambling establishment. The invention provides means to store software such as application data or special programs on a mass storage devices, such as a hard disk drive, via removable media in conjunction with an authentication process. The authentication system and method described herein allows for use of a removable media device in conjunction with removable media to perform various operations on the gaming device. These operations include but not limited to loading or installing software on the gaming device, updating software on the gaming devices, performing diagnostics or troubleshooting the gaming device using software on the removable media, and performing authentication on one or more mass storage device(s). Using the authentication system and method described herein on the contents of both the mass storage devices and the removable media can be achieved thereby guaranteeing the validity and accuracy of the software on the mass storage devices and the removable media. This desirably insures accuracy of game play, prevents alteration of the intended payout schedules and game operation and may achieve compliance with various gaming regulatory bodies.

Example Embodiments

Figure 1:
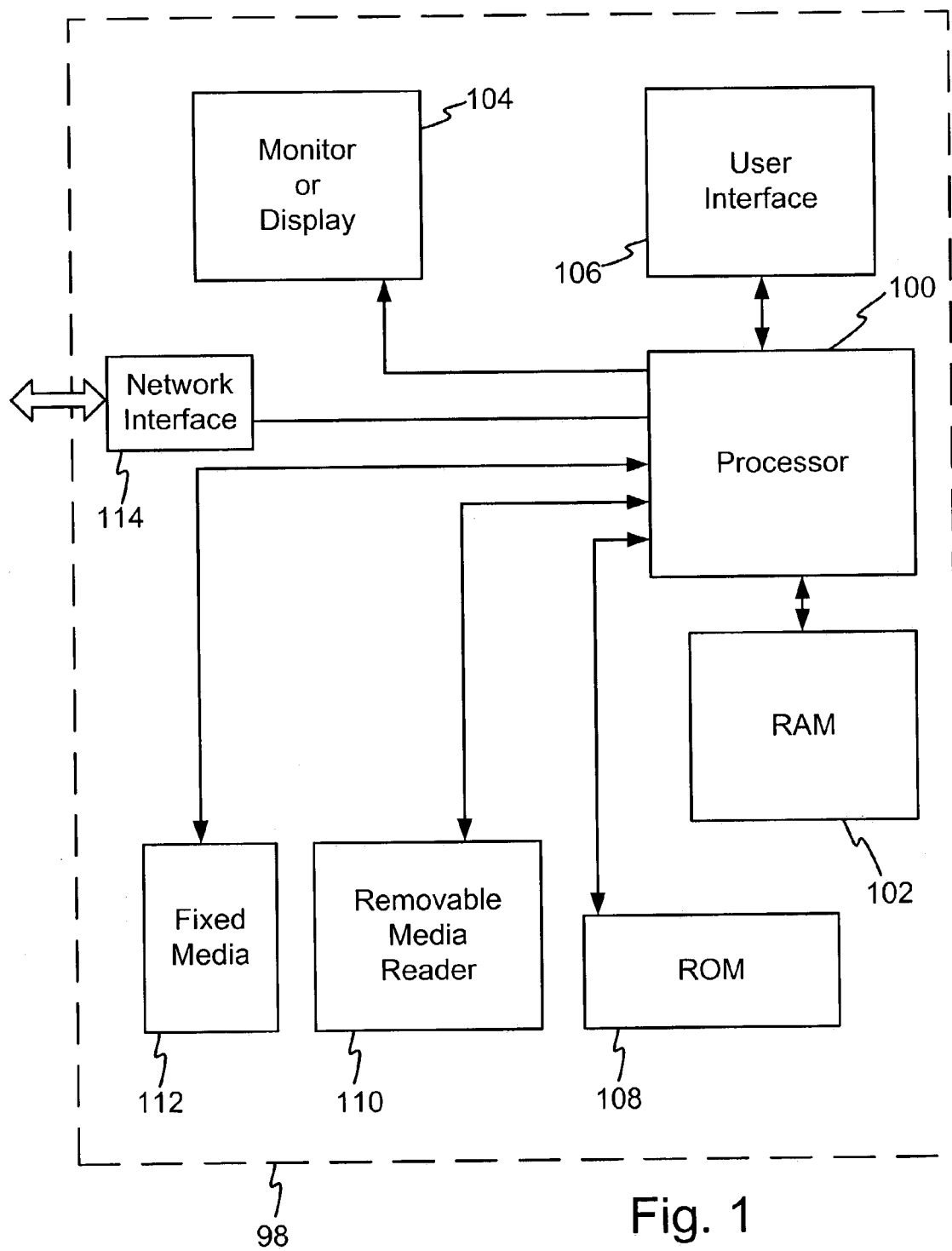
FIG. 1 illustrates a block diagram of one embodiment of the invention described herein.

FIG. 1 illustrates a block diagram of one example embodiment of the invention. It is contemplated that some of the apparatus shown may be eliminated without departing from the invention. Likewise, additional apparatus may be added to the elements shown without departing from the invention. Turning now to the elements of a device 98, one or more processors 100 serve as a central processing unit to oversee operation of the device and execute software code. Processors capable of executing software code and interfacing with other electronic apparatus and memory are known in the art and accordingly are not described in great detail herein. The processor may comprise any processing unit capable of executing authentication algorithms. In one embodiment the processor comprises an AMD brand K6-2 processor. In another embodiment the processor comprises an Intel brand Pentium III processor. Memory 102 is associated with the processor 100. A monitor or display device 104 and a user interface 106 are also in communication with the processor 100. As is commonly understood, the display 104 provides a means to exhibit the results of the processor operation or any output resulting from the execution of software code. Likewise, the user interface 106 provides means to obtain input from a user or player to control or aid the operation of the processor 100 and software code running on the device 98. The monitor or display 104 may comprise a CRT display, plasma screen, LCD display or any other electronic device. The user interface 106 may comprise one or more buttons, keys, a mouse, touch pad, touch screen, lever or any device capable of receiving human input. If the device 98 is configured as a gaming device, the monitor 104 exhibits game play during operation and the user interface 106 provides means for a gambler to control or initiate game play.

Also included in the device 98 having authentication capability described herein is a mass storage media or fixed media 112, a removable media reader 110, and a secure memory 108. These apparatus operate in conjunction with the processor 100 to authenticate software that at least in part controls the device 98. In one embodiment the secure memory 108 comprises one or more memory devices configured to store software code that initiates or boots operation of the device 98 and to store authentication algorithms for use by the processor to authenticate software code.

One type of secure memory comprises a read only memory, other apparatus other than read only memory (ROM) may be utilized as secure memory 108. It is desired that the secure memory 108 be generally unalterable once written with trusted software code and algorithms. The term trusted software code as used herein to mean code that is known to be accurate and operates in a manner intended by a game manufacture, software provider, or regulatory entity. The term data, software, applications, programs and the like are used herein to mean any computer readable data or executable programs. The secure memory 108, being non-rewritable, prevents tampering by individuals intending to alter operation of the device 98.

Figure 2:
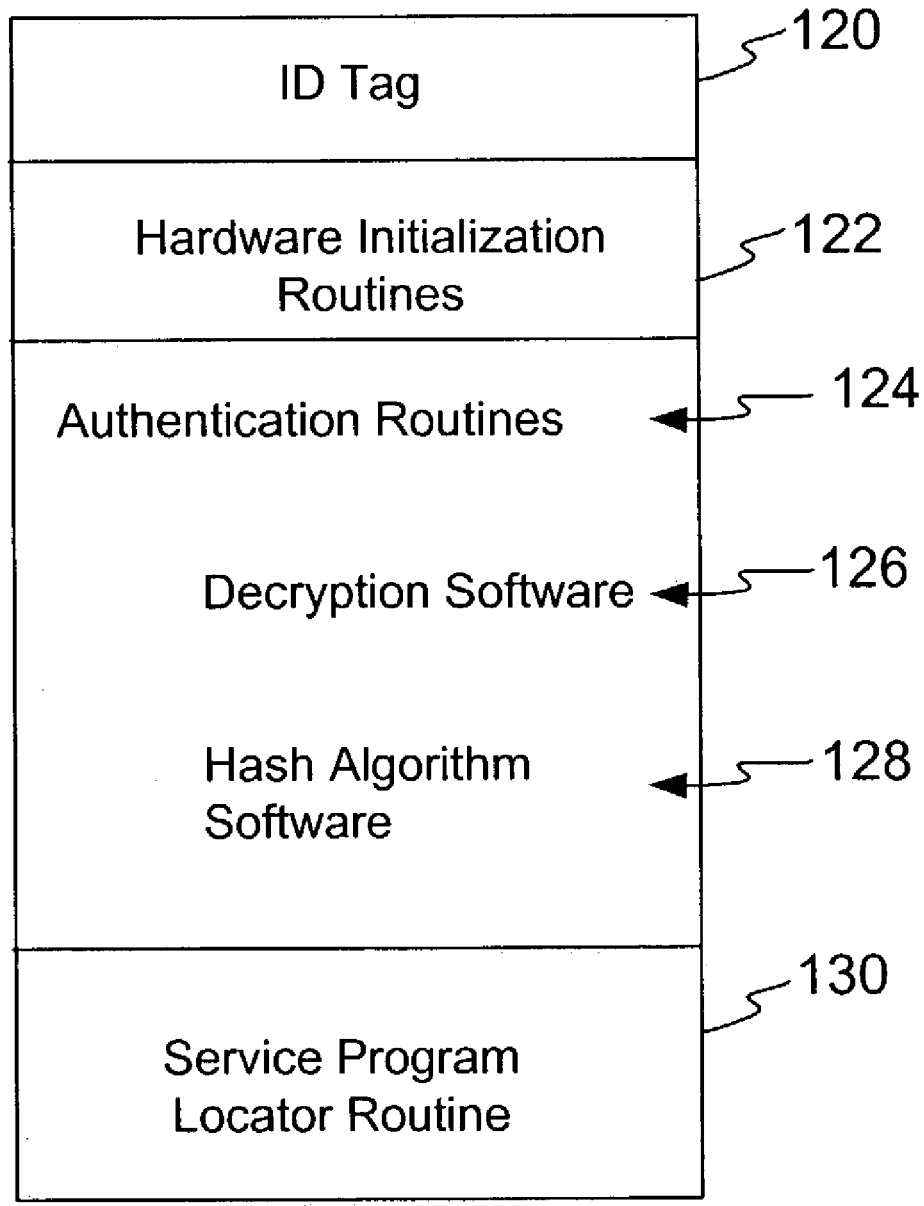
FIG. 2 illustrates a block diagram of exemplary contents of secure memory as contemplated for use with the invention described herein.

FIG. 2 illustrates a block diagram of exemplary contents of the secure memory 108. As shown in the embodiment of a ROM, the contents include an ID tag 120, hardware initialization routines 122, authentication routines 124 including in one embodiment decryption software 126 and hash algorithms or hash software 128, and service program locators 130. Each of these is briefly described. The ID tag 120 comprises an optional identification code inserted on the ROM to provide further identification of origin. In one embodiment, the presence and content of the ID tag 120 is verified at start-up.

The hardware initialization routines 122 are of the type commonly found on electronic apparatus. The initialization routines 122 initiate or boot operation of the processor 100 and load drivers for each of the hardware apparatus utilized on the device 98, such as the display 104, user interface 106, fixed media 112, and removable media reader 110. The initialization routines 122 are common to the initial start-up process of computers. These functions may require that some portion of an operating system is also contained within the hardware initialization routines.

The authentication routines 124 comprise the mathematical algorithms that the processor 100 executes on the software contained on the fixed media 112, removable media that interfaces with the removable media reader 110, or other software to be authenticated. In one embodiment the authentication routines 124 comprise mathematical algorithms encoded into software that are read by the processor 100 and executed on software to verify that it has not been altered.

In the embodiment described herein the authentication routines 122 include decryption software 126 and hash algorithms 128, such as MD5. In other embodiments, the authentication routines 124 comprise any hash algorithm including SHA-1, MD5, MD4, MD2, or any other method of hashing or authenticating data. The decryption software 126 comprises software capable of encrypting or decrypting various data files or data. In one embodiment, the decryption algorithms comprise digital signature type decryption algorithms. In other embodiments the encryption comprises DSA type encryption/decryption, RSA type encryption/decryption, Elgamal type encryption/decryption, or any other type of encryption/decryption method of encrypting and decrypting data. Operation of the decryption software is described below in greater detail.

The hash algorithm 128 comprises one or more algorithms to execute public key crypto-system operations. Two popular and exemplary types of algorithms comprise Rivest, Shamir and Adleman (RSA) type algorithms and Digital Signature Algorithms (DSA) type algorithms. Both are generally known by those of ordinary skill in the art of hash functions and/or data encrypting. The hash algorithm software 128 comprises software and data to be verified in fixed media or removable media. In a preferred embodiment RSA type hash functions or encryption is utilized and in particular Message Digest 5 (MD5). As is understood, execution of hash operation on a file, which may comprise a software application, generates a code or value unique to the particular file. In one embodiment the value is a unique 128 bit value. In another embodiment the value comprises a unique 160 bit value. Alteration of the file will cause the hash operation, if executed on the altered file, to generate a generally different code or value due to the alteration of the file. While there is some very, very, small number that represents the possibility for two files to generate the same hash value, it is almost impossible for the hash operation to not detect a change.

The ROM 108 stores the MD5 algorithms. These algorithms are read and executed by the processor 100 on the various routines stored on the ROM 108 or the removable media 110. The results of the hash operation are compared to the values of previous executed hash operations. Differences between the hash values reveal differences in the software. Changes as minor as a change in a single bit in the software are detected. Thus, in the environment of a gaming machine, the change in a single digit in a pay-out percentage would be revealed.

The ROM, in this embodiment the secure memory 108, also contains service program locator routines 130 configured to search for and locate particular programs located on the fixed media 112, a removable media in the removable media reader 110, or other storage device (not shown). Service programs are programs that initiate a desired operation on the media. Service programs may comprise, but are not limited to, installation programs, configuration programs, set-up programs, tutorial programs, up-date programs, diagnostic programs, demonstration programs, authentication algorithms, or other software that initiates operation after authentication of the software on fixed media 112 or removable media.

In yet another embodiment or configuration, the authentication system utilizes software on a server or remote host. In such a configuration, the service programs may be located on media at the server or remote host. Likewise, the authentication process could occur on the software located on any remotely located media. As can be contemplated, the authentication process could access and/or authenticate software or data located at any location accessible via communication medium. Thus, advantages of networked systems can be realized using the authentication process described and claimed herein. For example, gaming devices linked via a computer network and located on a gaming area could automatically undertake the authentication process to update or load software or data to the gaming machines.

Returning again to FIG. 1, the device 98 also includes a fixed media 112 in communication with the processor 100 or the memory 102. The fixed media 112 comprises any media or memory capable of storing software code, applications, or data, such as that controlling operation of the device 98. In one embodiment the fixed media 112 comprises a hard disk drive. It is desired that the fixed media 112 be of a capacity sufficient to store large volumes of data and software to facilitate operation of modern devices that require such software.

A removable media reader 110 is also in communication with the processor 100 or memory 102. The removable media reader 110 comprises any device capable of reading a removable media. In one embodiment, the removable media reader 110 comprises a CD-ROM drive, although in other embodiments the removable media reader comprises a tape drive, other optical devices, such as DVD ROM, CD-ROM, flash memory reader, disk drive, 'zip' drive, memory sticks, smart cards, wireless or infrared connections to a PDA or any other media interface, and devices that communicate over a USB communication link. The removable media reader 110 is configured to accept and read data from a removable media. It is contemplated that the removable media store software to be loaded onto the fixed media 112 or executed to facilitate operation of the device.

Figure 3:
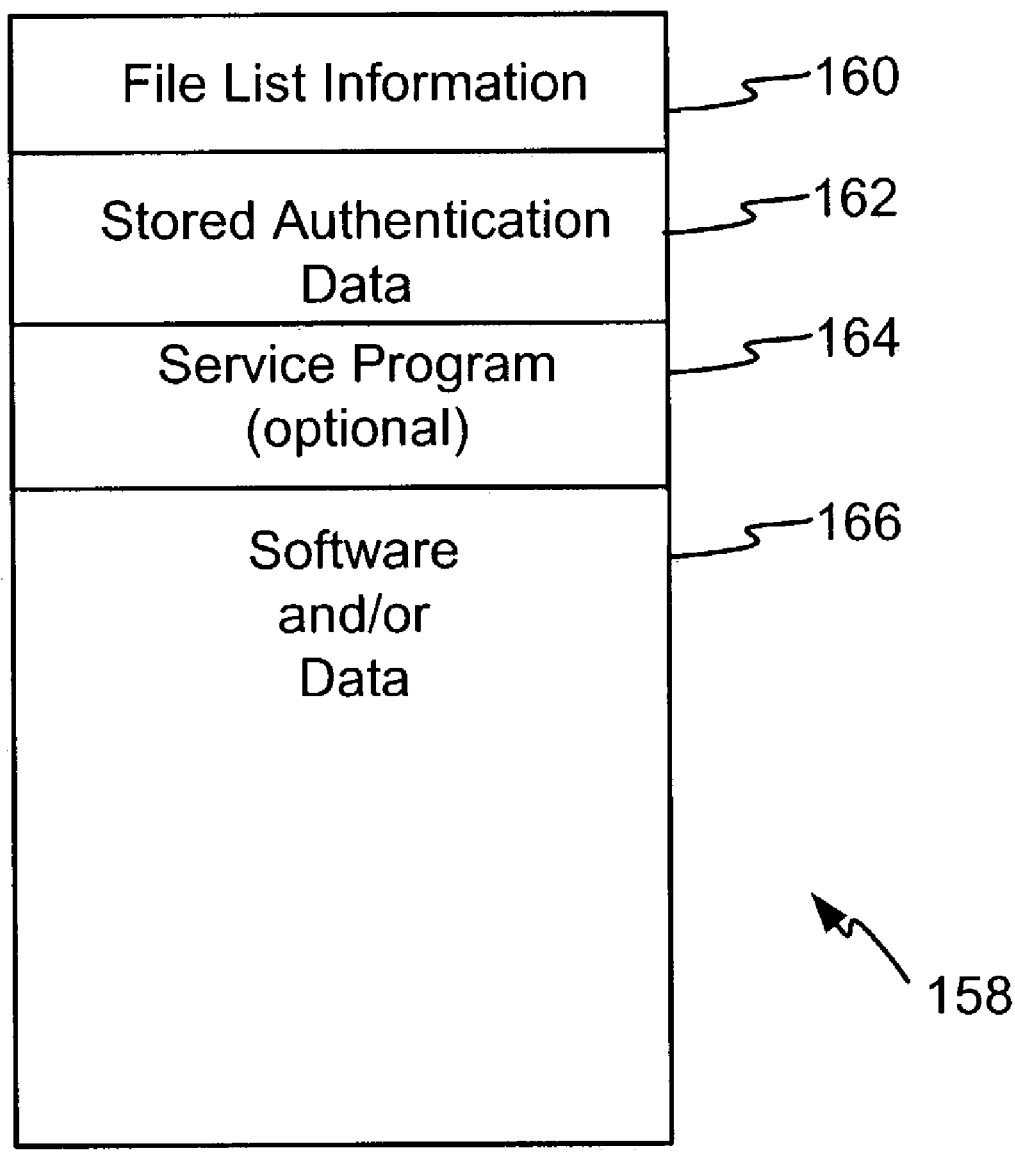
FIG. 3 illustrates a block diagram of exemplary contents of removable media or other media as contemplated for use with the invention described herein.

FIG. 3 illustrates a block diagram of exemplary contents of a removable media 158, the removable media being interfaced with the removable media reader or interface 110. In this example embodiment, the removable media 158 contains file list information 160, stored authentication data 162, one or more service programs 164, and various software 166. The file list information 160 comprises information regarding the contents of the removable media 158. In one embodiment the file list information 160 comprises a list of every file stored on the removable media. This information can be compared to the actual contents of the removable media at a later date to verify that every original file is present.

The stored authentication data 162 comprises one or more files containing information generated by a hash function operation. At least some of this data may be in an encrypted format. In one embodiment, a unique hash value is stored in the authentication data 102 for each file on the removable media 158.

In the embodiment described herein the removable media 158 also includes one or more service programs 164. As described above, the service programs 164 comprise programs that execute. One example of the service program 164 is an installation program configured to install software from the removable media to the fixed media 112 or other storage on the device. Another example of a service program 164 is a software program configured to execute a program stored on the removable media 158.

The removable media 158 also contains software 166. In various embodiments the software comprises software to be installed on the device to control or update device operation, data such a video or sound clips to enhance device operation, or diagnostic or troubleshooting programs. The removable media may also provide data storage and software for use by the main gaming software to execute from fixed storage.

Returning to FIG. 1, a network interface module 114 communicates with the processor 100. The network interface module 114 interfaces with a computer or electronic network (not shown) to facilitate communication of data or software from a computer or electronic network to the network interface 114 in the device 98. The network interface 114 provides an alternative means to access the device 98. It is contemplated that in various embodiments, authentication may occur over a network through the interface 114. Remote storage may also be accessed via a network in a manner similar to access of the removable media.

Figure 4:
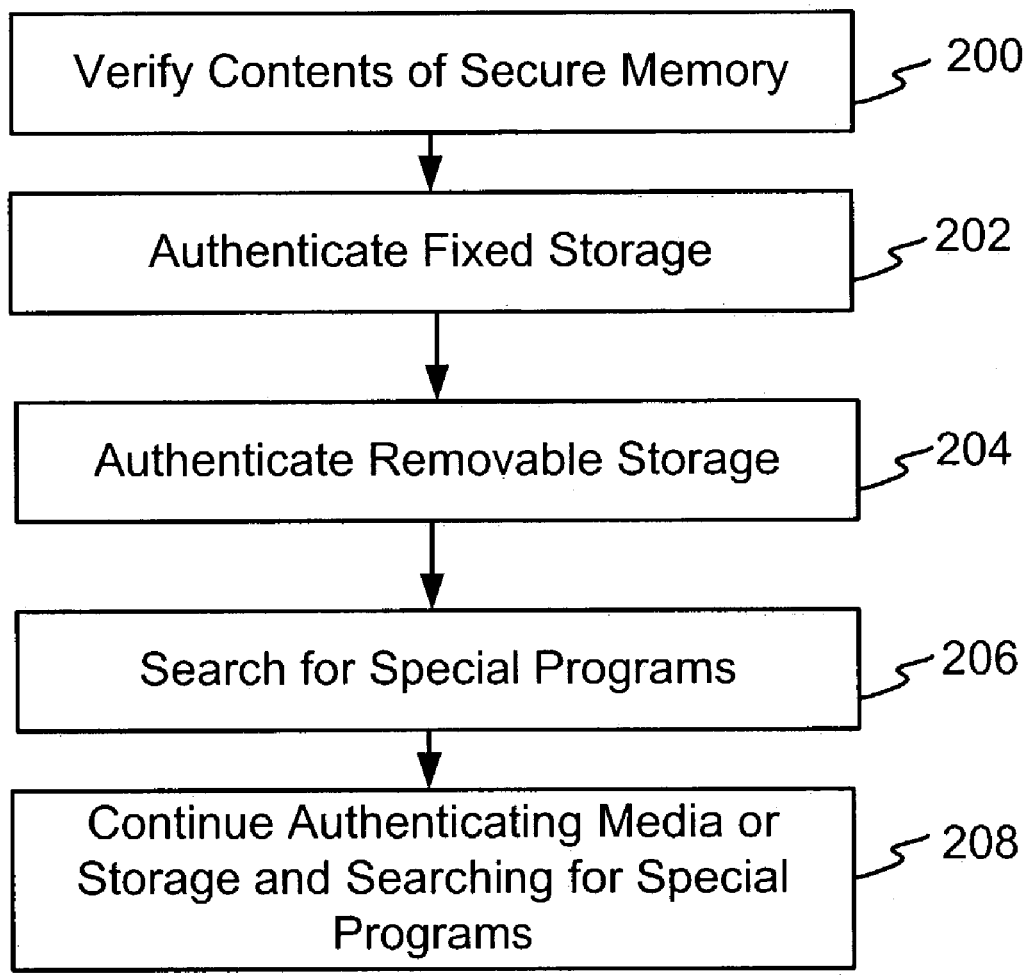
FIG. 4 illustrates a high level operational flow diagram of one exemplary method of operation of the invention described herein.

In reference to FIG. 4 a high level block diagram of an exemplary method of operation is shown. It should be noted that this is but one possible method of operation and is provided for purposes of understanding the invention in principle. Other methods are contemplated without departing from the scope of the invention. At a step 200, the secure memory and the processor verify the contents of the secure memory to determine if the secure memory has been subject to tampering, or is corrupt. It should be noted that in this example, it is assumed that ROM device on which the secure memory is located is trusted. In generally, physical tampering with this device leaves physical evidence of the tampering. One example method of verifying the contents of the secure memory comprises use of checksums or CRC operations. In such a configuration the secure memory would be authenticated by an external method. Then the device should remain secured within the gaming machine. CRC's may be performed to check for unintentional damage or for tampering. For example, evidence tape or other method may be used to secure the device.

After the secure memory has been verified, at step 200, the contents of the secure memory are assumed to be accurate and reliable, i.e. trusted. Next at a step 202, the operation authenticates the fixed storage device to verify that its contents have not been altered or otherwise subject to tampering. Next, at a step 204, the operation authenticates the removable media to verify that its contents have not been altered or otherwise subject to tampering. Those of ordinary skill in the art will realize that execution of steps 202 and 204 can occur in any order. Further, the operation can authenticate additional media storage if desired. If a removable media is not present in the removable media reader, the system does not perform step 204.

Next, at a step 206, the operation searches for special programs. If a special program is found it is executed to carry out the operation intended. At a step 208, the system can continue to authenticate media and search for additional special programs. Hence, a first special program can install a particular software, a second special program can configure the software and a third special program can execute the software.

Figure 5:
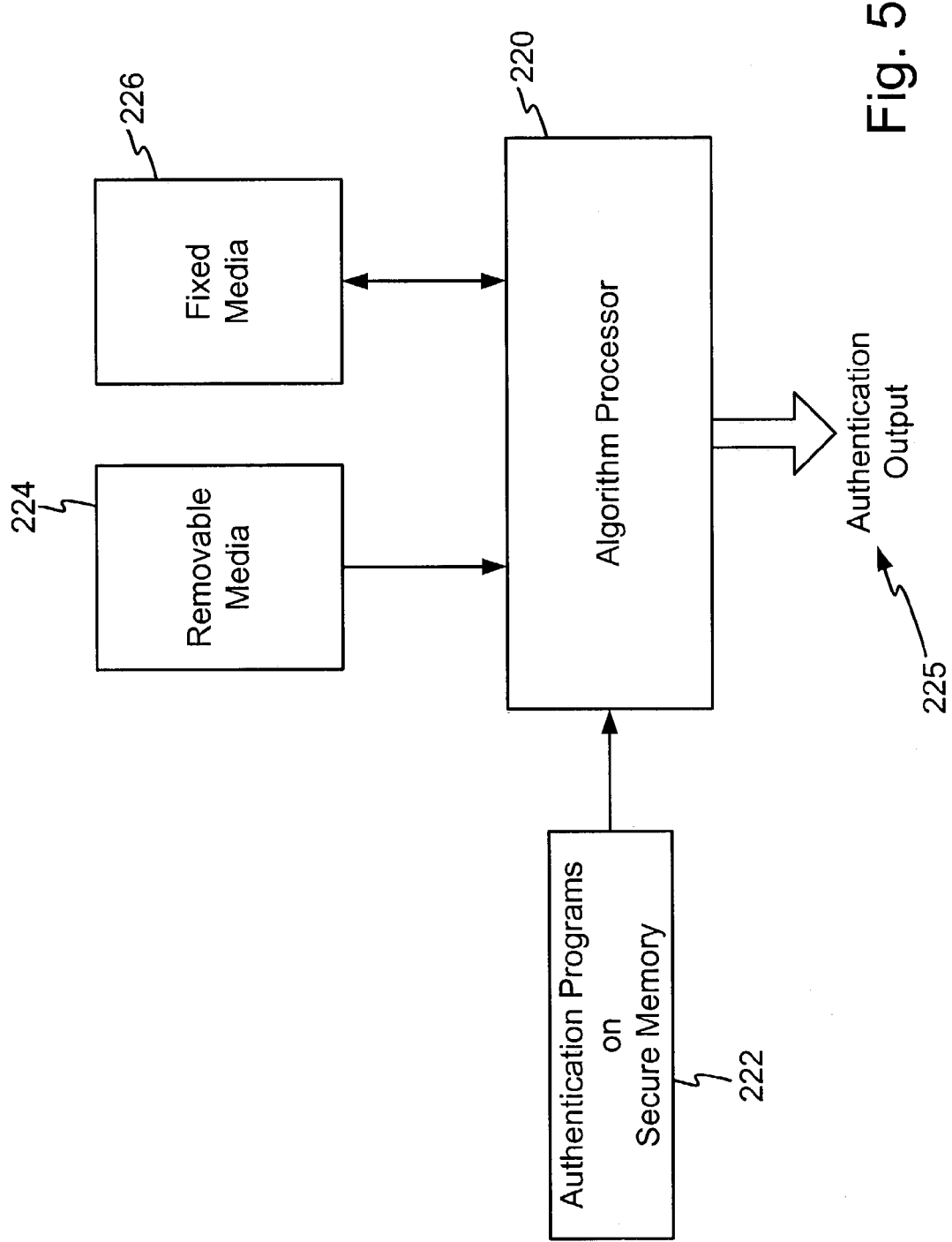
FIG. 5 illustrates a high level block diagram of communication between exemplary hardware and software of one embodiment of the invention described herein.

FIG. 5 illustrates exemplary hardware utilized to achieve the method illustrated in FIG. 4. As shown, an algorithm processor 220 is configured to receive authentication algorithms from a secure memory 222 or some other trusted source. The algorithm processor 220 may comprise one or more CPUs, DSPs, processors, control units, or any other device capable of executing algorithms or software code. Upon receiving the authentication programs the algorithm processor 220 executes the authentication algorithms on one or more software programs on the removable media 224 and the fixed media 226. The output comprises authentication output 225. In one format, the authentication output 225 comprises a simple binary output indicating that the authentication passed or the authentication failed. In this manner, a removable media with a large storage capacity can be placed into a compatible removable media reader and the contents of the algorithms, executed by the processor 220 can automatically confirm the trustworthiness of the content of the removable media. This is a more efficient and useful manner of operation over the prior art. If the content of the removable media is accurate, the contents of the removable media can be installed on the fixed media 226. In this manner, trusted software can be installed on the fixed media in a secure, simple, in-expensive manner without the need for highly skilled technicians.

Figure 6:
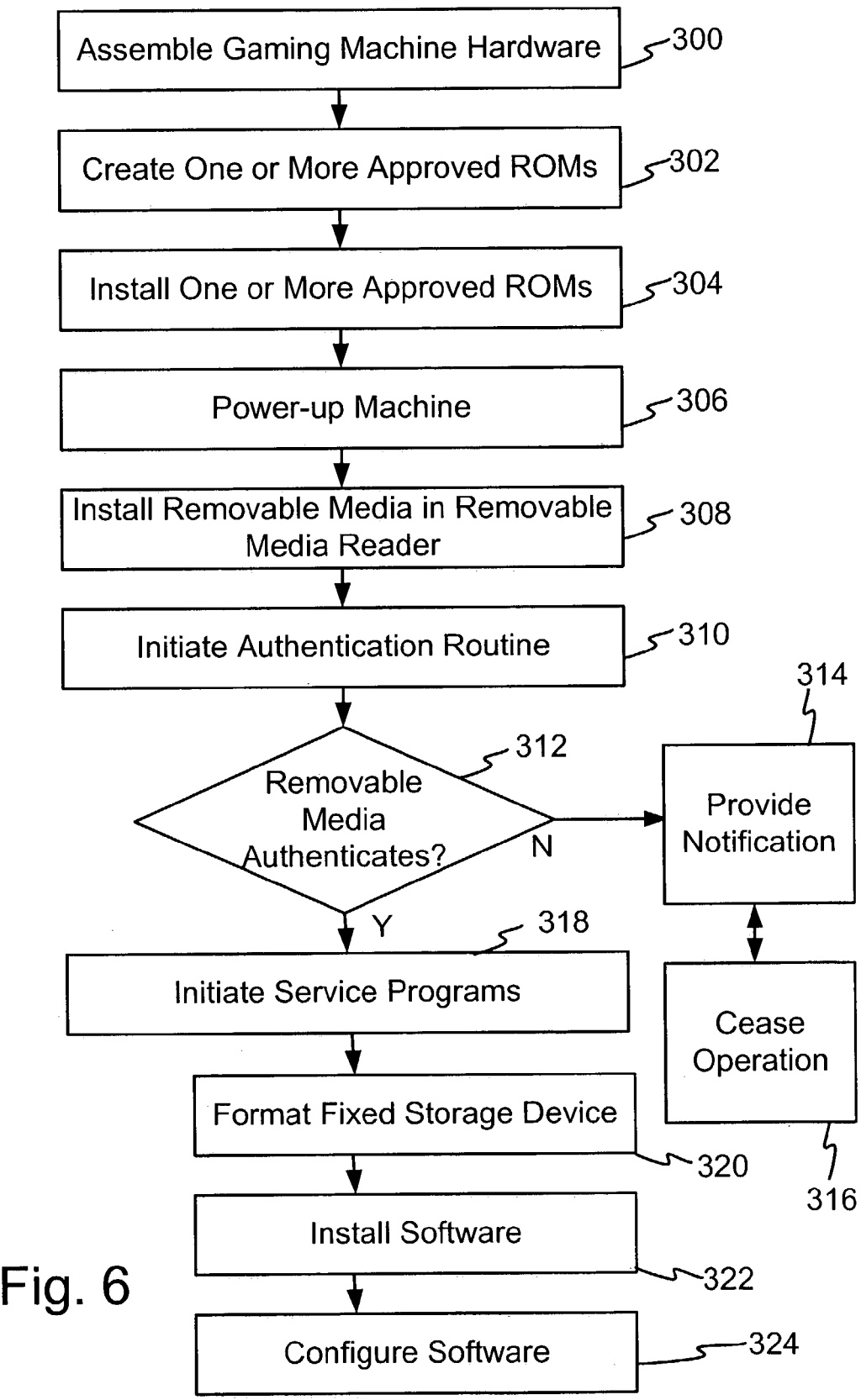
FIG. 6 illustrates an operational flow diagram of an exemplary method of installation and set-up of one exemplary embodiment of the invention described herein.

FIG. 6 illustrates an operational flow diagram of an exemplary method of installing software onto a fixed storage device in accordance with the principles described herein. The authentication process is discussed in more detail below. In this particular example method of assembly and installation, the process is described in terms of a gaming machine. It is contemplated, however, that devices other than a gaming machine will benefit from this method. At a step 300, the gaming machine hardware is assembled. At a step 302, one or more secure memory elements are created and approved. In one embodiment the secure memory comprises a ROM. At a step 304, the one or more EPROMs or ROMs are installed in the gaming machine and the gaming machine powered-up, step 306.

Next the process of installing software begins. At a step 308, removable media containing software to be loaded onto the gaming device is loaded into the removable media reader. This operation can be performed in the field or at the location where the gaming machine is assembled. At a step 310 the system initiates the authentication process to verify that the content of the removable media is trusted. This step is discussed in more detail below.

Next, at a decision step 312, the operation determines if the removable media authenticates. If the authentication process does not authenticate, the operation progresses to a step 314 wherein the system provides notification that authentication has failed and, at a step 316, the system ceases operation.

Alternatively, if decision step 312 determines that the removable media authenticates, the operation progresses to a step 318 wherein the operation initiates operation of service programs. In this example embodiment of an installation routine, the operation may format a fixed storage device, install software, and configures installed software, steps 320, 322, 324.

Example Method For Creating Authentication Data

Thus, in an example involving a gaming device, the software portion of the game stored on the removable media is intended to eventually be loaded onto the fixed media of the gaming device to update gaming device software. However, prior to the software on the gaming device being loaded onto the fixed media, i.e. to control game play, the software on the removable media must be authenticated. As is commonly understood, a software application program or update often comprises a number of files that operate together.

As referenced in element 162 of FIG. 3 and used in step 202 and 204 of FIG. 4, it is contemplated that the media to be authenticated contains authentication data, in one embodiment in the form of an authentication file. The authentication data comprises data generated at a secure location from trusted software, i.e. software that is known to be accurate and in some instances software that is approved by a regulatory body. In one embodiment the authentication data stored in the authentication file is in the form of a file verification table (FVT) configured to store a hash value entry for each file. To create the hash value entries stored in the FVT, the hash operation algorithms stored on the secure memory are executed on each file stored on the media (fixed, removable, or any other) and the resulting hash value is stored in the FVT such that it in some way corresponds with the software file from which it was created. The FVT thus contains a unique value created by the hash operation for each file on the removable media.

Figure 7:
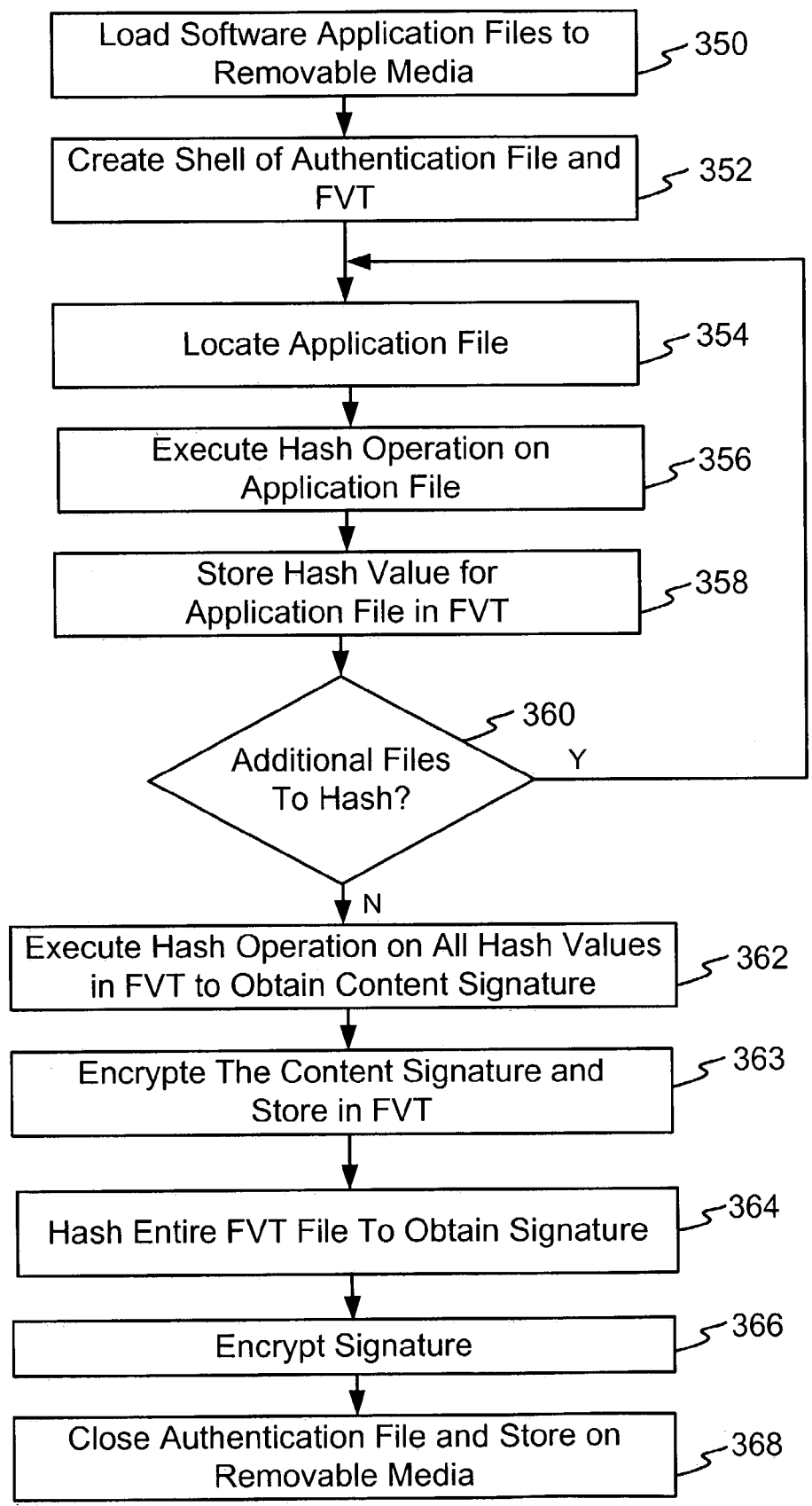
FIG. 7 illustrates an operational flow diagram of an exemplary method of creation of a verification file for use with the invention described herein.

FIG. 7 illustrates an operation flow diagram of an example method of creating the authentication file. This method is one exemplary method of operation and it is contemplated that other methods of creating authentication data may be utilized. Further, this method is available for use on any of a removable media, fixed or mass media, software stored on a network, or other any other data storage apparatus.

At a step 350 the authentication data creation process loads software application files to a removable media. In other methods, the software may comprise files other than application files and the files may be loaded on the media prior to the initiation of the this process. Next, at a step 352, the operation creates a shell file that will become the authentication file storing the FVT.

At a step 354, the operation locates an application file. The process of locating the one or more files may occur in any manner known in the art. One such method comprises selecting an application file based on directory structures, while another method comprises selecting application files alpha-numerically. Once the first application file is selected, the operation executes a hash operation on the selected application file. The hash operation may comprise any hash operation capable of returning a unique value for a particular file. To facilitate a check at a later state of the authentication process, the hash operation used in obtaining the hash values for the FVT is preferably generally similar to the hash operation used in later stages of authentication. Using the same algorithm insures that a given file will yield an identical hash value if the file has not been altered.

Thereafter, at a step 358, the operation stores the hash value in the FVT. In one preferred embodiment the hash value is stored with an association with the application file from which the hash value was created. Next, at a decision step 360, the operation determines if there are additional files on the media to execute the hash operation. If there are files for which a hash value has not been created, then the operation returns to step 354 and the operation repeats. If at decision step 360 the operation determines that no additional files exist on which to perform the hash operation, then the operation progresses to a step 362 and the method executes the hash operation on all hash values presently stored in the FVT. The hash operation creates a unique hash value for the hash values stored in the FVT to provide means to detect tampering or unwanted alteration of the hash values in the FVT. This hash value generated by executing the hash operation on the stored hash values is referred to herein as a content signature of the hash values. Next, at a step 363, the operation encrypts the content signature and stores it in the FVT. Next, at a step 364, the operation hashes the entire FVT file and obtains a signature for the entire FVT file.

Next, at a step 366 the operation encrypts the signature value and stores it in the FVT. In one embodiment this value, the encrypted signature value for the FVT is appended to the end of the file. Encryption of the signature prevents the alteration of the signature, thereby providing additional security against tampering. At a step 368 the operation closes the authentication files and stores the authentication file on the removable media. The FVT within the authentication file is thus available if the removable media is used in the future. The FVT contains unique data created based on the content of the removable media when the content of the removable media was known to be trusted as accurate.

In other configurations, the FVT is created or stored on media other than the removable media, such as a fixed media like a hard drive, to provide authentication capability.

Figure 8:
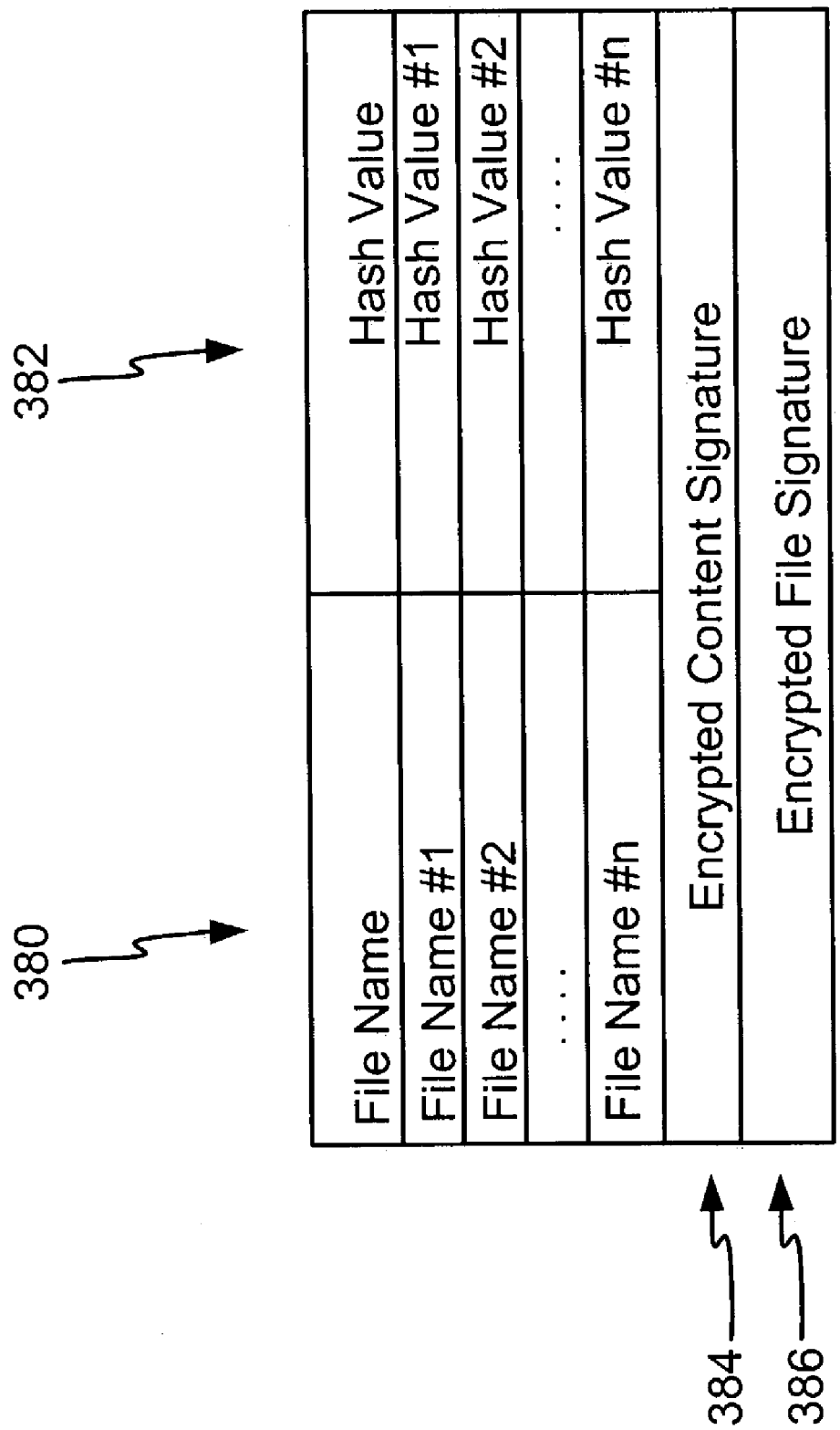
FIG. 8 illustrates an exemplary format and content of a verification file.

FIG. 8 illustrates an example configuration of a file verification table (FVT) as contained within the authentication file. In this example configuration, the FVT contains a listing of each file 380, identified by name. Associated with each file is the hash value 382. The hash value is the unique value created by executing the hash operation on each file 380 associated with the removable media. The FVT also contains an encrypted content signature 384 which is an encrypted hash value obtained from executing the hash operation on each of the hash values 382. The FVT also contains an encrypted file signature 386. This is but one possible arrangement and exemplary content of data to assist in the authentication of software or data contained on a media for use in a device. Those of ordinary skill in the art will understand that other arrangements are possible without departing from the scope of the invention. The FVT may be stored on the media with which it is associated or at a different location.

Once the above described authentication file is on a media (fixed, removable, or other) it provides a unique key to determine if the software on the media has been altered since the authentication file was created. The media can then be put to any use intended and using the authentication file a determination can be made whether the software on the media has been altered. The authentication process is described below.

Figure 9:
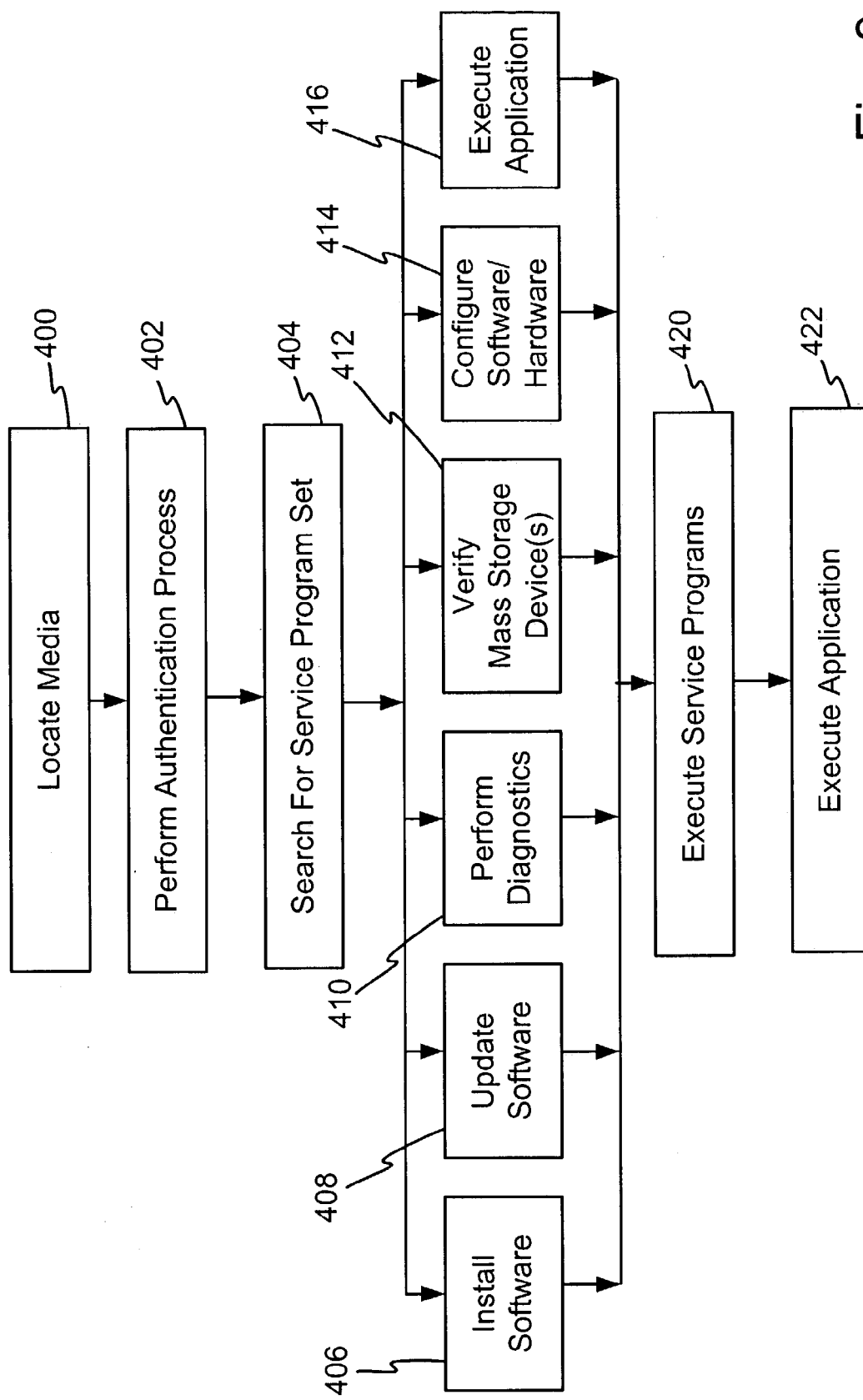
FIG. 9 illustrates an operational flow diagram of various example implementations of the authentication process as described herein.

In reference to FIG. 9, a high level operational flow diagram of an exemplary authentication process is shown. At a step 400 the authentication operation locates a media to authenticate. It is contemplated that prior to use of a media, it is authenticated to insure that the data or software contained thereon is trusted. After the media to be authenticated is located, the operation, at a step 402 performs the authentication process. This process is described in greater detail below in FIGS. 10A and 10B. If the media passes authentication, assumed for purposes of discussion, the operation searches for a service program at a step 404. The service program may comprise any program configured to initiate operation of a desired task or routine or action. Provided for purposes of understanding and not limitation is a listing of various service program initiation programs, at steps 406–416. As shown the service program set may initiate installation of software 406, a software update 408, diagnostics 410, verify or authenticate a media 412, configuration software 414, or code to execute an application 416. Upon running the service program at a step 420, the service program may consequently run one or more applications based on special programs, step 422.

Figure 10A:
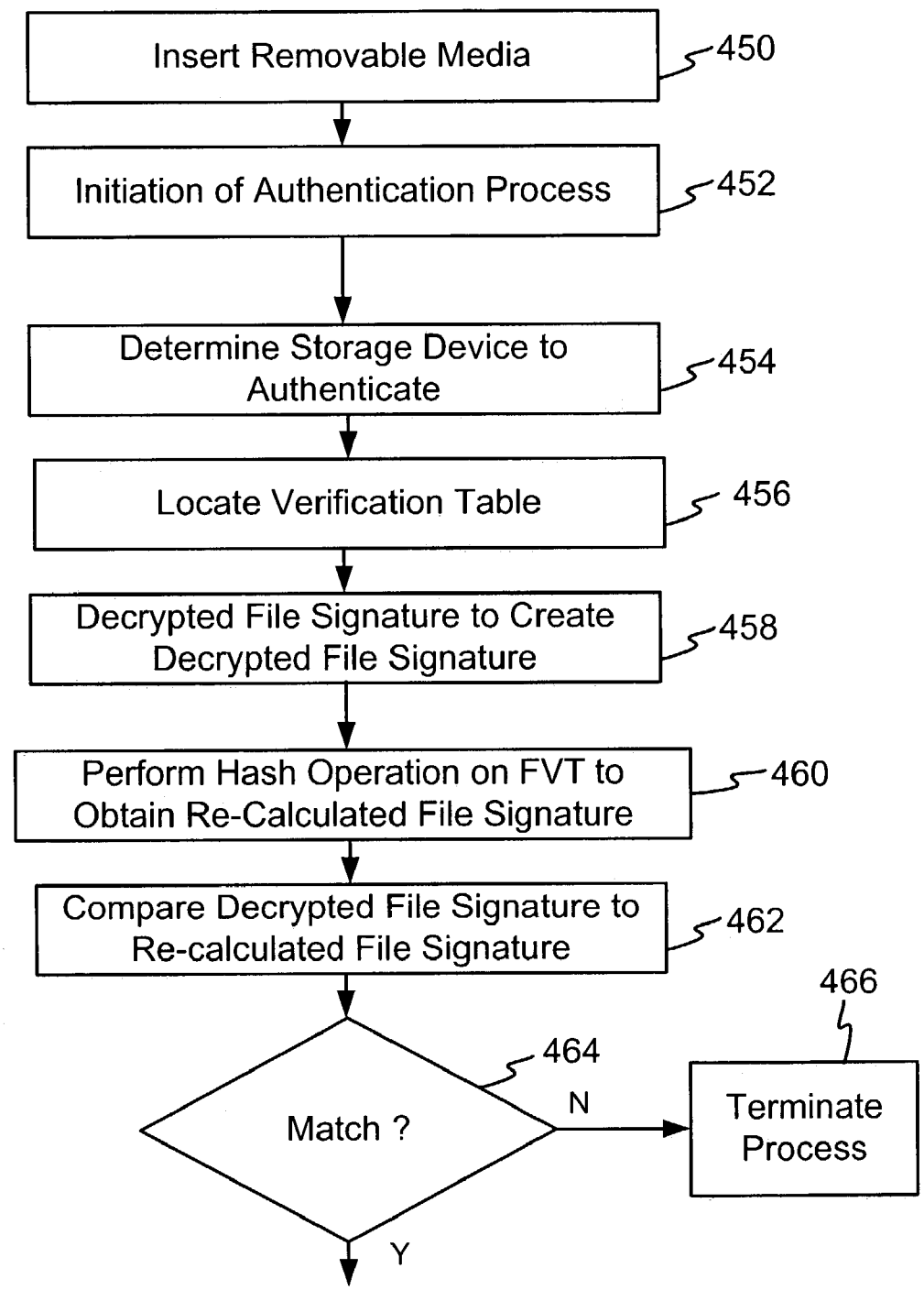
FIGS. 10A and 10B illustrate an operational flow diagram of an exemplary method of authentication as described herein.
Figure 10B:
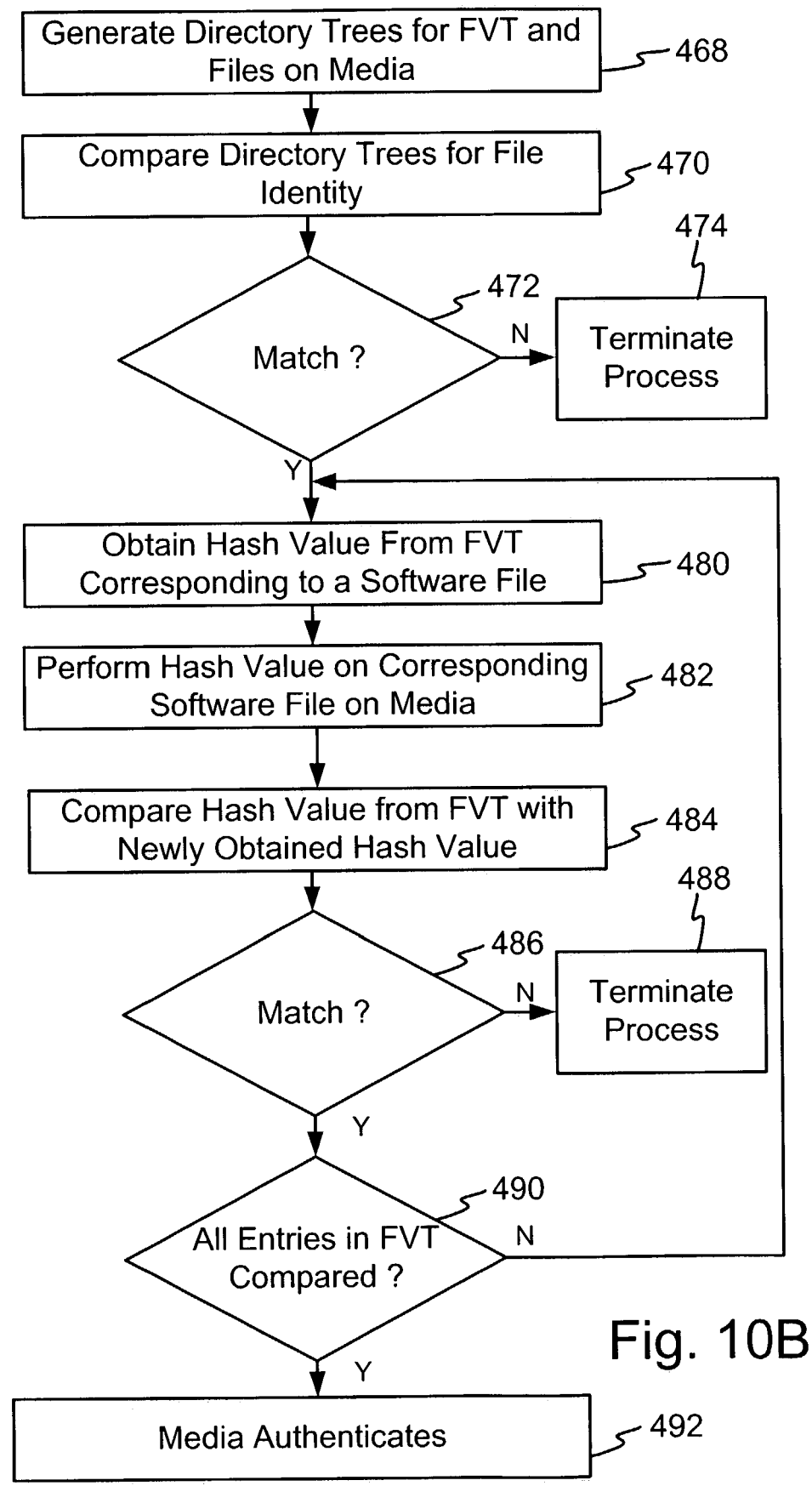

FIGS. 10A and 10B illustrate an operation flow diagram of an exemplary method of authentication as was referenced in step 402 of FIG. 9. In one environment, this method is performed, for example, when a removable media is used in a system, such as a gaming device, to establish that the software on the removable media is trusted and the software on the fixed media of the gaming device is also trusted. The method described below is in reference to authentication of a removable media. In reference to FIG. 10A, at a step 450 a user inserts a removable media into a removable reader.

Thereafter, at a step 452 the process of authentication can automatically occur or require some event from a user. At a step 454 the operation determines a media to authenticate. Any order of authentication is acceptable.

Next, at a step 456, the operation searches the media for the verification file stored on the media. The creation and content of the verification file is discussed above. At a step 458, the operation utilizes the decryption algorithms from the secure memory to decrypt the file signature stored in the FVT. The encrypted file signature is shown as element 386 on FIG. 8. After decrypting the file signature value stored in the FVT, the operation performs a hash operation on the FVT file up to the encrypted content signature 384, to obtain a re-calculated file signature. This occurs at a step 460. Thereafter, at a step 462, the operation compares the decrypted signature to the re-calculate file signature to check for differences in the values. At a decision step 464, a determination is made whether the signatures match. If the decrypted signature does not match the re-calculated signature, the operation progresses to a step 466 and the process terminates. Such a failure to match at step 464 indicates possible tampering or alteration and the installation or game operation should not occur or may have occurred inaccurately.

If at decision step 464 the operation determines the decrypted signature matches the re-calculated signature, the operation progresses to a step 468 wherein the operation generates a directory tree or other directory and/or file listing of the files on the media and the FVT. Any various structure or listing of directories and/or files can be utilized such that it facilitates a comparison between the directory trees or structure and/or the files on the FVT and the media. This comparison, that occurs at a step 470 indicates whether the same directories and/or files exists on the media as compared to the listing in the FVT as was recorded at a prior time when the media content was known to be trusted. At a decision step 472 the method determines if there is a match between the directories or files recorded in the FVT and the directories or files currently on the media. If there is not a match, the operation moves to a step 474 and the process terminates.

If there is a match at step 472, the operation progresses to a step 480. At step 480, the operation begins performing the hash operation on each file stored on the media and comparing the resulting hash value to the hash value stored in the FVT. Thus, at step 480 the operation obtains a hash value corresponding to a file. The hash value is obtained from the FVT. Next at a step 482, the operation locates the corresponding file on the media and performs the hash operation on the file. It is preferred that an identical hash function be utilized at step 482 as was used to create the entries in the FVT.

At a step 484, the operation compares the hash value from the FVT to the re-calculated hash value for the corresponding software file stored on the media. At a decision step 486 a determination is made as to whether these two hash values match. If the values do not match, the operation moves to a step 488 and the process terminates. If the values match, the operation moves to a decision step 490 wherein the operation determines if all the entries of the FVT have been compared to re-calculated values.

If at decision step 490 there are additional FVT entries to compare, the operation returns to step 480 and the operation repeats as shown. If at decision step 490 all the FVT entries have been compared to re-calculated entries, the operation progress to a step 492 wherein the determination is made that the media has been authenticated. It is contemplated that this process can occur on any media for which authentication is desired. It is further contemplated that many other variations may be made to the general process outlined herein without departing in scope from using a removable media to update or install system software or execute other desired functions while utilizing any manner of authentication to determine that the software on the media, fixed, removable, or otherwise, is trustworthy.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A method of verifying application data and using the application data to present a game on a gaming machine, the method comprising:

providing the gaming machine with a fixed media for storing application data for use in presenting one or more games at the gaming machine, a main memory into which the application data is loaded from the fixed media at one or more times, and a removable media reader for reading application data from a removable media and for providing that application data to the fixed media, and a secure memory comprising an authentication software;

reading first authentication data from said removable media, the first authentication data comprising a file verification table (FVT) comprising an entry for each application file of the application data and a first hash value for each application file, the FVT also comprising an encrypted file signature, the encrypted file signature obtained by performing a hash function on the FVT, the reading of the first authentication data comprising decrypting the encrypted file signature to provide a decrypted file signature;

performing calculations from the authentication software on said application data to obtain second authentication data based on said application data on said removable media, the second authentication data comprising application files stored on the removable media and a re-calculated file signature obtained by performing another hash function on the FVT;

comparing said first authentication data to said second authentication data, the comparing of the first and second authentication data comprising comparing the decrypted and re-calculated file signatures and, if they match, performing a hash function on each application file of the removable media to obtain a second hash value for each application file on the removable media, and one file at a time, comparing the first and second hash values;

installing said application data from said removable media to said fixed media if said first authentication data is identical to said second authentication data; and loading said application data from said fixed media directly to said main memory at a plurality of later times for use in presenting a game without further authentication, whereby use of said application data at each successive use is expedited, it being established that the application data is authentic from authentication prior to loading said application data to said fixed media.

2. The method in accordance with claim 1 wherein said installing further comprises formatting said fixed media.

3. The method in accordance with claim 1 wherein said removable media comprises a CD-ROM disc.

4. The method in accordance with claim 1 wherein said calculations comprise MD5.

5. The method in accordance with claim 1 wherein said first and second authentication data comprises the output of an MD5 hash function.

6. The method of claim 1 wherein the first and second hash values are compared one file at a time and if any set of first and second hash values do not match, the comparing is stopped.

7. The method of claim 1 wherein the first authentication data further comprises a directory tree for the FVT and the second authentication data comprises a directory tree for the application files on the removable media and the comparing further comprising the directory trees.

8. A method of providing application data to a gaming machine comprising:
   providing said gaming machine with a fixed media for storing authenticated application data, a removable media also for storing application data and first authentication data, a secure memory comprising an authentication software and a main memory into which application data is loaded from the fixed media at one or more times, the first authentication data comprising a file verification table (FVT) comprising an entry for each application file of the application data and a first hash value for each application file, the FVT also comprising an encrypted file signature, the encrypted file signature obtained by performing a hash function on the FVT;
   providing to said gaming machine said application data and first authentication data from said removable media;
   decrypting the encrypted file signature of the first authentication data to provide a decrypted file signature;
   generating second authentication data from said application data using the authentication software of the secure memory, the second authentication data comprising application files stored on the removable media and a re-calculated file signature obtained by performing another hash function on the FVT;
   comparing said first and second authentication data, the comparing of the first and second authentication data comprising comparing the decrypted and re-calculated file signatures and, if they match, performing a hash function on each application file of the removable media to obtain a second hash value for each application file on the removable media, and one file at a time, comparing the first and second hash values;
   determining if said first authentication data is identical to said second authentication data, and if so, authenticating said application data;
   storing said authenticated application data at said fixed media if said comparing determines that said first authentication data is identical to said second authentication data; and
   transferring at one or more times to said main memory directly from said fixed media said authenticated application data without further authentication for use in presenting a game.

9. The method in accordance with claim 8 wherein said removable media comprises a CD-ROM disc.

10. The method in accordance with claim 8 wherein the providing of the application data to the gaming machine comprises transmitting said application data from a remote server over a network.

11. The method in accordance with claim 8 wherein said generating comprises performing a hash function.

12. The method of claim 8 wherein the first and second hash values are compared one file at a time and if any set of first and second hash values do not match, the comparing is stopped.

13. The method of claim 8 wherein the first authentication data further comprises a directory tree for the FVT and the second authentication data comprises a directory tree for the application files on the removable media and the comparing further comprising the directory trees.

14. A gaming device configured to execute application data to present a game comprising:
   a removable media reader configured to read application data from a removable media and read authentication data from said removable media;
   a fixed media configured to receive said application data read from said removable media by said removable media reader;
   a secure memory configured to store one or more algorithms, said algorithms configured to process data and generate a value unique to said application data;
   a processor configured to read first authentication data from a removable media, to read said algorithms from said secure memory and to process said algorithms on said first authentication data from said removable media to create a second value authentication data, the first authentication data comprising a file verification table (FVT) comprising an entry for each application file of the application data and a first hash value for each application file, the FVT also comprising an encrypted file signature, the encrypted file signature obtained by performing a hash function on the FVT, the reading of the first authentication data comprising decrypting the encrypted file signature to provide a decrypted file signature, the second authentication data comprising application files stored on the removable media and a re-calculated file signature obtained by performing another hash function on the FVT, and said processor being further configured to cause said application data to be authenticated and installed onto said fixed media when said first authentication data is determined to be identical to said second authentication data, the first and second authentication data being determined to be identical when the decrypted file signature is identical to the re-calculated file signature and when the first and second hash values for each application file are identical; and
   a processor memory accessible by said processor for storage of authenticated application data provided from said fixed media from which said application data may be executed, said processor configured to load authenticated application data from the fixed media to the processor memory repeatedly without additional authentication.

15. The gaming device in accordance with claim 14 wherein said secure memory includes encryption or decryption algorithms.

16. The gaming device in accordance with claim 14 wherein said removable media read, fixed media, secure memory, processor, and processor memory are all located in a housing of said gaming device.

17. The gaming device in accordance with claim 14 wherein said fixed media comprises a hard disk drive.

18. The game device in accordance with claim 14 wherein said removable media reader comprises a CD-ROM reader.

* * * * *